United States Patent [19]
Zweifel et al.

[11] Patent Number: 4,463,142
[45] Date of Patent: Jul. 31, 1984

[54] PHOTOCROSSLINKABLE POLYMERS WITH SIDE GROUPS DERIVED FROM INDENONE AND THE PREPARATION AND USE OF THESE POLYMERS

[75] Inventors: Hans Zweifel, Basel; Joseph Berger, Marly; Hans Bosshard, Basel, all of Switzerland

[73] Assignee: Ciba-Geigy Corporation, Ardsley, N.Y.

[21] Appl. No.: 419,385

[22] Filed: Sep. 17, 1982

Related U.S. Application Data

[60] Division of Ser. No. 304,521, Sep. 21, 1981, Pat. No. 4,399,259, which is a continuation of Ser. No. 113,834, Jan. 21, 1980, abandoned.

[30] Foreign Application Priority Data

Jan. 30, 1979 [CH] Switzerland .......................... 886/79

[51] Int. Cl.³ ............................................. C08G 59/40
[52] U.S. Cl. ..................................... 525/502; 525/507
[58] Field of Search .................... 525/289, 328.8, 502, 525/507; 526/284

[56] References Cited

U.S. PATENT DOCUMENTS 3,985,566 10/1976 Buhr .................................... 526/284

Primary Examiner—Paul R. Michl
Attorney, Agent, or Firm—Luther A. R. Hall

[57] ABSTRACT

The invention relates to polymers which are crosslinkable under the action of light and contain side groups of the formula

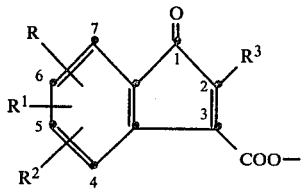

in which $R^3$ is preferably chlorine and R, $R^1$ and $R^2$ are, for example, H or $-CH_3$. The proportion of these groups in the polymers is preferably 20 to 100%. Because of their high sensitivity to light, the polymers are suitable for photographic applications.

1 Claim, No Drawings

PHOTOCROSSLINKABLE POLYMERS WITH SIDE GROUPS DERIVED FROM INDENONE AND THE PREPARATION AND USE OF THESE POLYMERS

This is a divisional of application Ser. No. 304,521, filed on Sept. 21, 1981, now U.S. Pat. No. 4,399,259, issued Aug. 16, 1983, which is a continuation of application Ser. No. 113,834, filed on Jan. 21, 1980, now abandoned.

The present invention relates to novel polymers which are crosslinkable under the action of light and have side halogeno-indenonecarboxylic acid groups, processes for their preparation and their use for crosslinking under the action of light, especially for the production of images.

Light-sensitive polymers based on halogenoindenonecarboxylic acids have not been disclosed hitherto and a corresponding sensitivity to light of this acid itself has also not been described. However, a number of polymers of different types which are crosslinkable by the action of light and in which crosslinking is effected by a photocyclodimerisation of specific C=C double bonds have already been disclosed. The patent applications and patents listed below constitute the prior art, which comprises not only light-sensitive polymers of this type but also corresponding light-sensitive monomers which are suitable for the preparation of such polymers: Japanese Published Specifications Nos.: 49-128,991, 49-128,992, 49-128,993, 50-5,376, 50-5,377, 50-5,378, 50-5,379, 50-5,380, 50-9,682, 50-10,884 and 50-77,363, German Offenlegungsschriften Nos.: 2,031,573, 2,032,037, 2,626,795 and 2,407,033 and U.S. Pat. No. 4,079,041.

With the exception of the polymers according to German Offenlegungsschrift No. 2,407,033, these known light-sensitive polymers are substances for which the sensitivity to light is due to maleimide groups or derivatives thereof. The sensitivity to light of the polymers according to German Offenlegungsschrift No. 2,407,033, on the other hand, is due to substituted 1-carbonyloxy-1H-naphthalen-2-one groups.

The crosslinkable polymers known hitherto have the disadvantage of a relatively low photochemical sensitivity and for this reason are not suitable or are not well suited for numerous applications for which substances highly sensitive to light are required, or, alternatively, they require the additional use of known photosensitisers, such as benzophenone, thioxanthone and the like. Moreover, these polymers are colourless. Frequently, however, for technical reasons it is desired that the light-sensitive material has a specific colour. With the known polymers, expensive dyeing is then necessary and this sometimes also results in interference.

The object of the invention is, therefore, to provide novel polymers which are crosslinkable under the action of light and have a high UV absorption in the long-wave range and, for this reason, ensure a high rate of crosslinking even without the addition of photosensitisers. Moreover, these polymers should have a very specific characteristic colour, which is not the case with the light-sensitive polymers of the prior art.

The invention relates to a polymer which is crosslinkable under the action of light, has an average molecular weight of at least 1,000 and contains side groups of the formula I

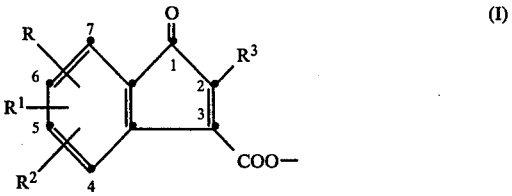

in which $R^3$ is Cl or Br, preferably Cl, and R, $R^1$ and $R^2$ are identical or different and R is a n-alkyl radical having 1 to 4 C atoms, preferably $CH_3$, or is H, Cl, Br or F, $R^1$ is a n-alkyl radical having 1 to 4 C atoms, preferably $CH_3$, or is H and $R^2$ is H or $CH_3$, or $R^1$ and $R^2$ together are the group $-CH_2CH_2CH_2-$, with the proviso that in the latter case the bond to the six-membered ring is via the C atoms in the 5-position and 6-position of the nucleus, the proportion of groups of the formula I being at least 5%, based on the number of recurring structural elements of the polymer. The proportion of groups of the formula I in the polymers according to the invention is in general 5 to 100 and preferably 20 to 100%, based on the number of recurring structural elements of the particular polymer.

The polymers according to the invention are, for example, those from the group of the phenol-formaldehyde resins, the novolacs and the phenoxy resins and those which are obtained by homopolymerisation or copolymerisation of monomers containing C=C double bonds.

The polymers according to the invention can be prepared by synthesis methods which are known per se for the preparation of macromolecules containing photoactive side groups. In principle, the following routes can be employed:

1. Incorporation of the groups of the formula I in an existing polymer chain and
2. Build-up of the polymer chain from monomers which already contain the light-sensitive group of the formula I, this build-up of the chain preferably being effected by means of polymerisation via C=C double bonds.

With the 1st method of preparation, the reaction is always carried out in the presence of inert solvents. With the 2nd method, the polymerisation is carried out either as block polymerisation or in the presence of inert solvents. Since both processes are carried out by basic methods known per se, it is superfluous here to give further data on the solvents which are to be used in some cases and on catalysts and temperatures. Basic methods of this type are, moreover, described in detail in U.S. Pat. No. 4,079,041. In this context reference should also be made to the fundamental handbooks and textbooks on the techniques of the various methods of preparation for polymers; thus, for example, to the "Kunststoff-Handbuch" ("Plastics Handbook") by R. Vieweg et al., Carl Hanser Verlag, Munich 1968 to 1975 and especially to Volumes I, IV, IX, X and XI, and to "High Polymers" by Carothers et al., Volumes I to XXVI, Interscience Publishers, New York 1956–1972.

The following handbook should also be listed: Houben-Weyl "Methoden der organischen Chemie" ("Methods of Organic Chemistry"), Volume XIV/1 (Macromolecular Substances, Part 1), Georg-Thieme Verlag, Stuttgart 1962.

In some cases, the same products can be obtained by methods 1 and 2, so that method 1 or method 2 can be used as desired. If the groups of the formula I are incorporated into an existing polymer chain, this incorporation is effected, for example, by an addition reaction with simultaneous opening of a ring system, for example of a dicarboxylic acid anhydride group or of an epoxide group.

A preferred embodiment of the polymers according to the invention is a homopolymer or copolymer of monomers containing reactive double bonds, which has average molecular weights of between 30,000 and 1,000,000 and which contains the groups of the formula I in molecule chain members of the formulae II to VI

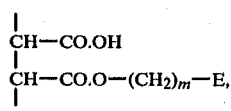
(II)

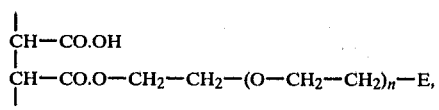
(III)

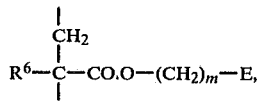
(IV)

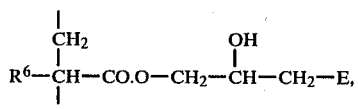
(V)

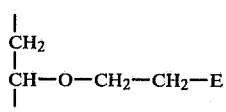
(VI)

in which the radical E has the formula I, m is a number from 2 to 6, n is a number from 1 to 10 and $R^6$ is H or —$CH_3$.

As well as containing one or more of the structural elements of the formulae II to VI, this preferred polymer can at the same time contain structural elements of the formula IX

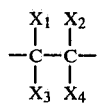
(IX)

in which $X_1$ and $X_3$ are each hydrogen, $X_2$ is hydrogen, chlorine or methyl and $X_4$ is hydrogen, methyl, chlorine, —CN, —COOH, phenyl, methylphenyl, methoxyphenyl, cyclohexyl, —COO-alkyl having 1–12 C atoms in the alkyl moiety, —COO-phenyl,

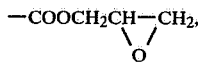

—COO-alkyl-OH having 1–3 C atoms in the alkyl moiety, —OCO-alkyl having 1–4 C atoms in the alkyl, —OCO-phenyl, —CO-alkyl having 1–3 C atoms in the alkyl, alkoxy having 1–6 C atoms or phenoxy, or $X_1$ and $X_2$ are each hydrogen and $X_3$ and $X_4$ together are the grouping

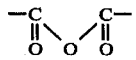

or are each —COOH or —COO-alkyl having 1–6 C atoms in the alkyl.

Amongst these particular polymers, those which are preferred are those which contain structural elements of the formula IX in which $X_1$ and $X_3$ are each hydrogen, $X_2$ is hydrogen or methyl and $X_4$ is —$OCOCH_3$, —COOH or —COO-alkyl having 1–8 C atoms in the alkyl, or in which $X_1$, $X_2$ and $X_3$ are each hydrogen and $X_4$ is —CN, chlorine or phenyl.

A further preferred polymer according to this invention is a polymer which is based on novolac as the starting material and which contains structural elements of the formula X

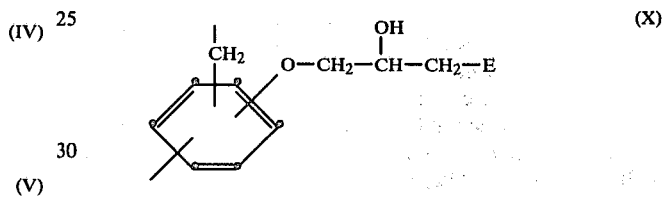
(X)

in which the radical E has the formula I. In this case the average molecular weights are between 1,000 and 100,000.

Particularly preferred polymers are those which contain molecule chain members of the formulae XVII to XXI.

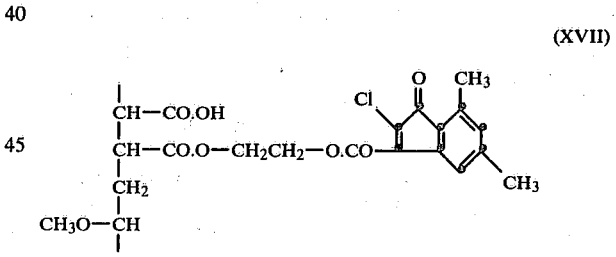
(XVII)

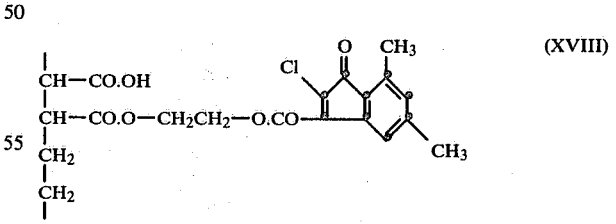
(XVIII)

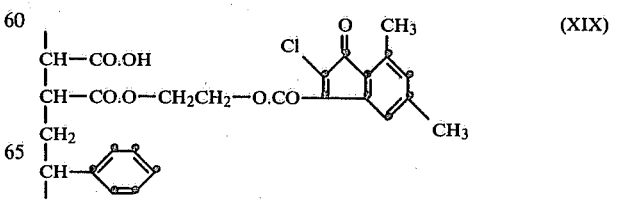
(XIX)

-continued

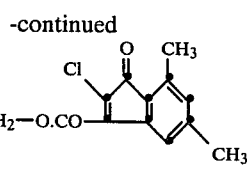  (XX)

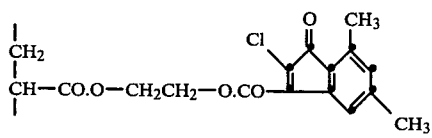  (XXI)

Some of the polymers according to the invention containing groups of the formula I can be prepared by reacting a polymer containing free-OH groups, preferably a synthetic resin of the novolac, phenoxy resin or phenolformaldehyde resin type, with a compound of the formula XI $$E-CH_2-\overset{O}{\overset{/\backslash}{CH}}-CH_2 \qquad (XI)$$

in which E has the formula I.

However, it is also possible to follow a procedure in which a synthetic resin which contains glycidyl groups instead of the free-OH groups and is preferably of the novolac, phenoxy resin or phenol-formaldehyde resin type is reacted with a halogenoindenonecarboxylic acid of the formula E-H, in which the radical E is the group of the formula I.

The preferred polymers which contain structural elements of the formula X can also be prepared by both procedures.

The polymers which contain the groups of the formula I in molecule chain members of the formulae II or III can be prepared by reacting a homopolymer or a copolymer of maleic anhydride, which polymer contains a substituted or unsubstituted maleic anhydride as a polymerised component, all or some of the anhydride groups being retained, with one of the compounds of the formulae XII and XIII $$E-(CH_2)_m-OH \qquad (XII)$$

$$E-(CH_2-CH_2-O)_n-CH_2-CH_2-OH \qquad (XIII)$$

in which m is a number from 2 to 6 and n is a number from 1 to 10 and in which E has the formula I.

However, these last-mentioned polymers or similar polymers can also be prepared by reacting maleic anhydride, which can be substituted, with one of the compounds of the formulae (XII) or (XIII) in a first reaction and, in a 2nd reaction, polymerising the particular resulting unsaturated monomer, if desired together with other comonomers which contain at least one C=C double bond.

Maleic anhydride is preferably used as the starting substance for these polymers. In principle, however, it is also possible to prepare corresponding polymers which are derived from substituted maleic anhydrides. The latter are in particular maleic anhydrides substituted by methyl. Suitable comonomers for maleic anhydride are, for example, styrene, vinyl ethers, ethylene and propylene.

A very particular preferred embodiment of the two last-mentioned methods of preparation is a process in which the compounds of the formulae XII or XIII which are employed are those compounds which also have the formulae XXII and XXIII.

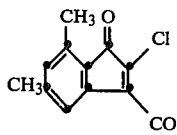  (XXII)

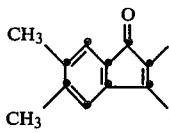  (XXIII)

The polymers which contain the groups of the formula I in molecule chain members of the formulae IV to VI can be prepared by polymerising one or more of the compounds of the formulae XIV to XVI $$CH_2=\underset{R^6}{\overset{|}{C}}-CO.O-(CH_2)_m-E \qquad (XIV)$$

$$CH_2=\underset{R^6}{\overset{|}{C}}-CO.O-CH_2-\underset{OH}{\overset{|}{CH}}-CH_2-E \qquad (XV)$$

$$CH_2=CH-O-CH_2-CH_2-E \qquad (XVI)$$

in which $R^6$ is H or $CH_3$ and m and E are as defined under formula II, if desired together with further comonomers.

Suitable comonomers for the monomers of the formulae XIV to XVI are, for example, acrylates and methacrylates which do not contain the radical E, styrene and vinyl compounds, such as vinyl ethers, vinyl chloride and vinyl acetate and vinylidene chloride.

The polymers containing molecule chain members of the formula IV can, however, also be prepared by subjecting a polyacrylic acid chloride or a polymethacrylic acid chloride, or a corresponding copolymer to a condensation reaction with, in each case, an ester of the formula $E-(CH_2)_m-OH$, in which E is the group of the formula I and m is a number from 2 to 6. In this context, copolymers are to be understood as meaning those which contain the same comonomers as have been mentioned for the monomers of the formulae XIV to XVI.

The polymers containing molecule chain members of the formula V can also be prepared by reacting polyacrylic acid glycidyl esters or polymethacrylic acid glycidyl esters, or corresponding copolymers containing monomers free from glycidyl groups, with halogenoindenonecarboxylic acids of the formula E-H.

After the particular reaction has ended, the polymer can be precipitated by pouring into suitable organic solvents, for example aliphatic hydrocarbons, alcohols or dialkyl ethers, such as n-pentane, n-hexane, methanol, ethanol and diethyl ether. The polymer is then in the form of an orange-coloured product.

The majority of those starting materials, for the preparation of the polymers according to the invention, which contain the characteristic group of the formula I which determines the sensitivity to light are novel. They are compounds of the formula a

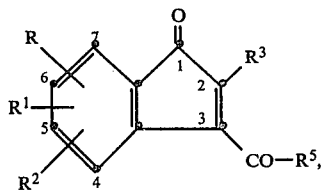 (a)

in which all of the indicated radicals R to $R^3$ are as defined under formula I and in which $R^5$ is one of the radicals $-OH$, $-O-(CH_2)_m-OH$, $-O-(CH_2-CH_2-O)_n-CH_2-CH_2-OH$, $-O-(CH_2)_m-O.CO.\underset{R^6}{C}=CH_2$, $-O-CH_2-\underset{OH}{CH}-CH_2-O.CO-\underset{R^6}{C}=CH_2$, $-O-CH_2-CH_2-O-CH=CH_2$ and

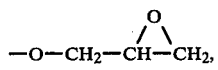

in which m is a number from 2 to 6, n is a number from 1 to 10 and $R^6$ is H or $-CH_3$, with the proviso that if $R^5$ is $-OH$ at least one hydrogen atom in the 4-position to the 7-position of the six-membered ring has been replaced by a substituent.

Halogeno-indenonecarboxylic acids of the formula a which contain hydrogen atoms in the 4-position to the 7-position, that is to say which contain no substituents, are not novel; however, both they and their derivatives are also suitable as starting materials for the preparation of the polymers of the formula I according to the invention.

The halogeno-indenonecarboxylic acids of the formula a (and the known halogeno-indenonecarboxylic acids which are not substituted in the 4-position to the 7-position) are parent compounds for all of the other compounds of the formula a.

The free halogeno-indenonecarboxylic acids are prepared by a novel process which comprises subjecting an aromatic compound of the formula b

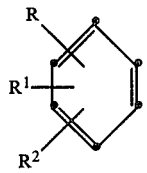 (b)

in which the H atoms on at least 2 adjacent C atoms in the nucleus have not been replaced by substituents and in which R, $R^1$ and $R^2$ are as defined under formula I, but all three radicals can be H at one and the same time, either together with a dihalogenomaleic anhydride of the formula

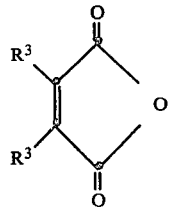 (c)

or together with an ester of the formula d

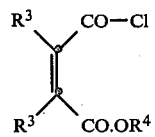 (d)

in which $R^3$ is as defined under formula I and $R^4$ is a low-molecular organic radical, especially an aliphatic radical, a cycloaliphatic radical, an aliphatic-aromatic radical or an aromatic radical, in each case in an approximately stoichiometric ratio, to a condensation reaction in the presence of $AlCl_3$ and if desired in the presence of inert fluxes and/or solvents, at temperatures between 40° and 150° C. and hydrolysing the reaction product thus obtained.

The hydrolysis is advantageously effected by pouring the complex compound initially obtained by the condensation reaction into a mineral acid/water/ice mixture. In some cases, especially when the solid residue disintegrates to a powder after all of the solvents have been removed, it is also possible to effect the hydrolysis by adding dilute mineral acids, such as hydrochloric acid, to the dry product, with cooling. Preferably, the reaction is carried out in one stage, as described above. In principle, however, the process can also be carried out in 2 stages by preparing a ketocarboxylic acid of the formula e

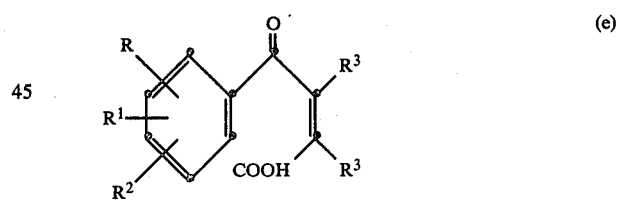 (e)

in the reaction mixture in the 1st stage, in a manner known per se, and isolating this acid and, in the 2nd stage, cyclising the ketoacid of the formula e, likewise in the presence of $AlCl_3$ and if desired in the presence of inert fluxes and/or solvents, but at temperatures between 40° and 150° C., to give the corresponding indenonecarboxylic acid of the formula I, which is liberated from the resulting reaction mixture by hydrolysis.

The reaction conditions for the 2nd reaction step thus correspond in virtually all respects to those for the 1-stage process, the only difference being that in this 2nd reaction step the intermediate of the formula e is already present, in place of the original starting materials of the formula b and c or d.

The starting materials of the formula b and c or d are known per se and can be prepared by conventional methods. The compounds preferably employed as the dihalogenomaleic anhydride of the formula c or as the ester of the formula d are, in each case, those compounds which have the formulae c and d in which $R^3$ is Cl. In principle, mixed halogeno compounds which contain Cl and Br at the same time can also be used. However, as is known, these products are not as readily accessible as, for example, dichloromaleic anhydride.

A large number of compounds can be employed as the esters of the formula d, since the radical $R^4$ can be a large number of organic groups, which are derived from corresponding alcohols and phenols. Preferably, $R^4$ is an aliphatic radical having a total of 1 to 4 C atoms, preferably $CH_3$.

In the reaction mixture which is initially introduced for the process for the preparation of the halogenoindenonecarboxylic acids, the $AlCl_3$ should preferably be present in an amount of at least 1 mol per mol of the dihalogenomaleic anhydride of the formula c or of the ester of the formula d.

If the reaction is carried out in the presence of inert solvents, the solvents or solvent mixtures to be employed are those which have a boiling point of not less than 40° C. Examples of suitable solvents are polyhalogenated aliphatic and aromatic hydrocarbons, such as o-, m- and p-dichlorobenzene, dichloromethane and 1,1,2,2-tetrachloroethane.

It is also possible to use inert fluxes. Suitable fluxes are inorganic salts or organic fluxes, or mixtures of the inorganic salts with the organic fluxes. The amount of fluxes used must preferably be so chosen that the melting point which results when the fluxes are mixed with the $AlCl_3$ in the reaction mixture is lower than the reaction temperature. Advantageously, the amounts employed are so chosen that a lowering of the melting point results when the fluxes are mixed with the $AlCl_3$, for example because of the formation of a eutectic mixture.

Organic fluxes preferably employed are dialkylamides of low-molecular carboxylic acids, for example dimethylformamide or diethylformamide. The amount should preferably be so chosen that the molar ratio of dialkylamide to $AlCl_3$ is between the limits 1:4 and 1:1.

Inorganic salts preferably employed are NaCl and/or KCl, if desired together with dimethylformamide as an organic flux. Further suitable inorganic fluxes (especially mixtures) can be taken from the publication by C. A. Thomas, "Anhydrous Aluminum Chloride in Organic Chemistry" (ACS Monogr.Ser.) (New York 1941).

All of the other starting materials mentioned above for the polymers according to the invention containing groups of the formula I are esters of the halogenoindenonecarboxylic acids described.

The esters of the formula a in which $R^5$ is the radical $-O-(CH_2)_m-OH$ are prepared by esterifying the corresponding halogeno-indenonecarboxylic acid with the particular alkylene glycol in the presence of inert organic solvents (for example ethylene glycol dimethyl ether) and esterification catalysts (for example sulfuric acid).

The esters of the formula a in which $R^5$ is the radical $-O-(CH_2-CH_2.O)_n-CH_2-CH_2-OH$ are prepared by adding n molecules of ethylene oxide onto the particular halogeno-indenonecarboxylic acid.

The esters of the formula a in which $R^5$ is the radical $-O-(CH_2)_m-O.CO-C(R^6)=CH_2$ are prepared by esterifying the particular hydroxy-alkyl ester (i.e. $R^5$ is the radical $-O-(CH_2)_m-OH$) with acrylic acid or methacrylic acid.

The esters of the formula a in which $R^5$ is the radical

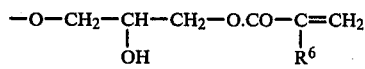

are prepared either by reacting glycidyl acrylate or glycidyl methacrylate with the particular halogenoindenonecarboxylic acid or by reacting acrylic acid or methacrylic acid with the particular halogenoindenonecarboxylic acid ester of the formula a in which $R^5$ is the radical

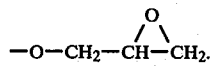

The last-mentioned product of the formula a is prepared by reacting epichlorohydrin with the particular halogenoindenonecarboxylic acid.

The esters of the formula a in which $R^5$ is the radical $-O-CH_2-CH_2-O-CH=CH_2$ are prepared by a condensation reaction of α-chloro-ethyl vinyl ether and the particular halogenoindenonecarboxylic acid.

In all the processes for the preparation of the halogenoindenonecarboxylic acid esters of the formula a, the reaction is preferably carried out in the presence of inert organic solvents.

The polymers according to the invention can be crosslinked under the action of light and are suitable, for example, for the production of printing plates for the offset printing process and for the preparation of photooffset lacquers, for unconventional photography, for staining polymer images, which are visible after exposure and developing, with suitable dyes, such as oil-soluble dyes or, if the polymer contains acid groups, such as carboxylic acid groups or sulfonic acid groups, cationic dyes. The polymers according to the invention are used in particular as so-called photoresists for the production of printed circuits by methods known per se. In this case the side of the circuit board provided with the light-sensitive coating is exposed through a slide negative carrying the circuit image and is then developed, the unexposed areas of the coating being dissolved by the developing liquid. Exposure can be carried out using sunlight, carbon arc lamps or xenon lamps. Advantageously, exposure is carried out using high-pressure mercury vapour lamps. The support materials can be coated with the light-sensitive polymers by techniques which are conventional per se, for example by immersion processes, spray coating, whirler coating, cascade coating or curtain coating or so-called "roller-coating".

The abovementioned use of the polymers which contain side groups of the formula I for crosslinking under the action of light, especially for the production of images, is a further subject of this invention.

EXAMPLES OF THE PREPARATION OF LIGHT-SENSITIVE POLYMERS ACCORDING TO THE INVENTION

EXAMPLE 1

2.5 g of a copolymer of methyl methacrylate and glycidyl methacrylate [(molar ratio 1:1), $\overline{M}w$ 60,000] are dissolved together with 1.8 g (8.63 mmols) of chloroindenonecarboxylic acid and 0.01 g of tetramethylammonium chloride in 20 g of cyclohexanone. This solution is heated at 120° C. for about 2 hours. After cooling to room temperature, the solution is filtered. The filtrate can be used direct as a coating solution for the preparation of photolacquer coatings.

In addition to structural elements of the formula

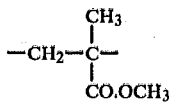

the resulting polymer contains structural elements of the formula

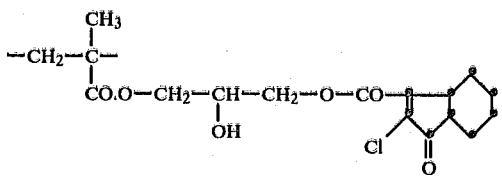

Like all of the polymers described in the examples which follow, it is orange coloured.

EXAMPLE 2

10 g of a copolymer of methyl vinyl ether and maleic anhydride (molar ratio 1:1 alternating, $\overline{M}w$ 740,000), 8 g (0.03 mol) of 2-hydroxyethyl chloroindenonecarboxylate and 0.15 ml of concentrated sulfuric acid are dissolved in 120 ml of dry tetrahydrofuran. The solution is refluxed for 24 hours under nitrogen. The solution is then cooled to room temperature and filtered. The filtrate can be used direct for coating purposes.

In order to determine the composition, a small sample of the filtrate is precipitated in ether.

Elementary analysis: Calculated: 55.27% C, 4.46% H, 6.28% Cl; Found: 55.85% C, 4.59% H, 5.56% Cl.

EXAMPLE 3

2.66 g of a copolymer of ethylene and maleic anhydride (1:1 alternating, $\overline{M}w$ 100,000) and 5.34 g (0.020 mol) of 2-hydroxyethyl chloroindenonecarboxylate are dissolved in 40 ml of dry N-methylpyrrolidone. This solution is boiled at 100° C. for 48 hours. After cooling to room temperature, it is filtered. The filtrate can be used direct for coating purposes. A sample is precipitated in ether and the intrinsic viscosity number of the product is determined. ($\eta$intr) (dimethylformamide, 20° C.): 0.3 dl/g.

EXAMPLE 4

The procedure is analogous to that of Example 1. The starting polymer used is Gantrez 119 AN$^R$. It is a product marketed by the GAF Corporation, USA and specifically is a copolymer of vinyl methyl ether and maleic anhydride and has a $\overline{M}w$ of approximately 740,000. The chloroindenone acid derivative used is 2-hydroxyethyl chloroindenonecarboxylate. The weight ratio of these reactants is 2:5.

A light-sensitive polymer with an intrinsic viscosity number ($\eta$intr.) of 0.25 dl/g (dimethylformamide; 20° C.) results.

EXAMPLE 5

The procedure is analogous to that of Example 4 except that 2-hydroxy-ethyl 2-chloro-5,7-dimethylindenonecarboxylate is used in place of 2-hydroxyethyl chloro-indenonecarboxylate and that the weight ratio of the reactants is 2:2.32 instead of 2:5. A photocrosslinkable polymer with a $\eta$intr. of 0.22 dl/g (dimethylformamide; 20° C.) results.

EXAMPLE 6

10.45 g of polymethacrylic acid chloride ($\overline{M}w$ 40,000), dissolved in 10 ml of dry toluene, are dissolved, together with 12.9 g (0.05 mol) of 2-hydroxyethyl chloroindenonecarboxylate, in 80 ml of chlorobenzene. 10 g of finely powdered 3 Å molecular sieve are added to this solution. This solution is refluxed for about 2 hours. After cooling to room temperature, the reaction solution is filtered and the filtrate is then precipitated in 2 l of methanol. After drying, the resulting pale powder has an intrinsic viscosity number $\eta$intr. (dimethylformamide, 20° C.) of 0.1 dl/g.

EXAMPLES OF THE PREPARATION OF HALOGENO-INDENONECARBOXYLIC ACIDS AND CORRESPONDING ESTERS, WHICH ARE USED AS STARTING SUBSTANCES FOR THE PREPARATION OF THE LIGHT-SENSITIVE POLYMERS

EXAMPLE A

A mixture consisting of 88 g of powdered, anhydrous AlCl$_3$, 16 g of NaCl, 5.4 g of KCl and 16.7 g (0.1 mol) of dichloromaleic anhydride is initially introduced into a stirred flask provided with a HCl outlet and is heated at 90°-100° C. for a short time (until it has melted). 10.6 g (0.1 mol) of m-xylene are added at 70°-75° C. in the course of 45 minutes. After stirring for a further 30 minutes at 75°-80° C., the melt is introduced into a mixture of 25 ml of concentrated hydrochloric acid, water and ice (final volume about 1 liter) and the product is filtered off. After washing with water and drying in vacuo at 60° C., 23.0 g (97% of theory) of yellow-orange 1-oxo-2-chloro-5,7-dimethyl-indene-3-carboxylic acid are obtained. According to the thin layer chromatogram, the product contains only slight impurities and can therefore be used direct for further reactions. When recrystallised from ethyl acetate, the product melts at 255°-256° C.

$^1$H-NMR spectrum (100 mHz, δ values in ppm, solution in (CD$_3$)$_2$SO): 2.27 (S, 3H, —CH$_3$); 2.38 (S, 3H, —CH$_3$); 6.8 and 7.2 (2H, aromatic); about 13.5 (broad signal, 1H, D$_2$O replaceable).

The chemical analysis and the $^1$H-NMR spectrum correspond to the formula

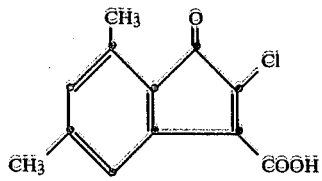

The indenones listed in the following table were prepared analogously.

| Example No. | Compound of the formula B | R³ (formula b structure) | Introduction of the compound of formula b into the melts — Time hours | Temperature °C | Reaction after introduction of the compound of formula b — Time hours | Temperature °C | Compound of the formula a | Yield % of theory | Recrystallised from | Melting point |
|---|---|---|---|---|---|---|---|---|---|---|
| b | m-xylene | $R^3$=Br | 1 | 70–75 | 0.5 | 75–80 | 2-Br-4,7-dimethyl-3-carboxy-indenone (CH₃, CH₃, Br, COOH) | 79 | ethyl acetate | 257 |
| c | benzene | $R^3$=Cl | 0.75 | 70–75 | 2 | 80–85 | 2-Cl-3-carboxy-indenone | 90 | water + ethanol (1:1) | 228 |
| d | toluene | $R^3$=Cl | 0.75 | 70–75 | 1.5 | 80–85 | 2-Cl-6-methyl-3-carboxy-indenone | 91 | ethyl acetate | 239 |
| e | p-xylene | $R^3$=Cl | 0.75 | 70–75 | 2 | 80–85 | 2-Cl-4,7-dimethyl-3-carboxy-indenone | 88 | chloro-benzene | 170 |
| f | indane | $R^3$=Cl | 1 | 70–75 | 1 | 75–80 | cyclopenta-fused 2-Cl-3-carboxy-indenone | 95 | toluene | 239 |
| g | mono-chloro-benzene | $R^3$=Cl | 1 | 80–85 | 2.5 | 95–100 | 2-Cl-6-methyl-3-carboxy-indenone (CH₃) | 55 | ethyl acetate | 258 |
| h | 1,2,3-trimethyl-benzene | $R^3$=Cl | 1 | 75–80 | 0.5 | 75–80 | 2-Cl-trimethyl-3-carboxy-indenone | 95 | glacial acetic acid | 225 |
| i | 1,2,4-trimethyl-benzene | $R^3$=Cl | 1 | 75–80 | 0.5 | 75–80 | 2-Cl-trimethyl-3-carboxy-indenone | 97 | toluene | 195 |
| s | n-butyl-benzene | $R^3$=Cl | 0.75 | 75–80 | 1 | 80–85 | 2-Cl-6-n-butyl-3-carboxy-indenone (CH₃(CH₂)₃) | 98 | cyclohexane | 157 |
| t | ethyl-benzene | $R^3$=Cl | 0.5 | 95–100 | 0.5 | 95–100 | 2-Cl-6-ethyl-3-carboxy-indenone (CH₃CH₂) | 99 | cyclohexane | 150 |

EXAMPLE J

A mixture consisting of 53 g of powdered, anhydrous AlCl₃ and 16.7 g (0.1 mol) of dichloromaleic anhydride in 80 ml of 1,2-dichloroethane is initially introduced into a stirred flask with a HCl outlet. 7.8 g (0.1 mol) of benzene are then added at 20°–30° C. in the course of about 30 minutes and the mixture is stirred at the indicated temperature until the thin layer chromatogram of a sample indicates complete conversion. The reaction mixture is then introduced into a mixture of 25 ml of concentrated hydrochloric acid, water and ice (final volume about 600 ml) and the dichloroethane solution is evaporated to dryness in vacuo. This yields 23.5 g of β-benzoyldichloroacrylic acid, which is cyclised under conditions analogous to those for the preparation of the chloroindenonecarboxylic acid by the 1-stage process according to Example c, i.e. in the presence of the same flux mixture and using the same temperatures. Yield 17.0 g, corresponding to 82% of theory. Melting point: 228° C.

The other halogeno-indenonecarboxylic acids of Examples a and b and of d to i can be prepared analogously by this two-stage process.

The same end products are obtained when, in the above examples, an acid chloride of the formula

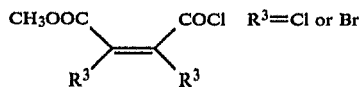

in used in place of dichloro- or dibromo-maleic anhydride, in an equimolecular amount.

EXAMPLE K 7.8 g (0.1 mol) of benzene are reacted with dichloromaleic anhydride in the presence of AlCl$_3$, in accordance with Example j, and the resulting brown reaction solution is filtered (without decomposition with dilute hydrochloric acid) to remove a little AlCl$_3$ which has not dissolved. The filtrate is evaporated to dryness in vacuo in a rotary evaporator. The residue is heated at 150° C. for 30 minutes, during which time it disintegrates to a powder. After the customary working up by introducing into dilute hydrochloric acid, isolating and drying, a crude product is obtained and this is freed from the sparingly soluble dark by-product by recrystallisation from chlorobenzene. This yields 6.2 g, corresponding to 30% of theory, of 1-oxo-2-chloroindene-3-carboxylic acid.

EXAMPLE L 14.6 g (0.2 mol) of dimethylformamide are initially introduced into a stirred flask with a HCl outlet and 54 g (0.1 mol) of powdered, anhydrous AlCl$_3$ and 16.7 g (0.4 mol) of dichloromaleic anhydride are introduced slowly, the temperature being kept below about 80° C. by cooling. 10.6 g (0.1 mol) of m-xylene are added at 70°-75° C. in the course of 45 minutes and the dark melt is stirred for 1.5 hours at 75°-80° C. Subsequent working up is carried out as described in Example a. This yields 22.9 g, corresponding to 97% of theory, of 1-oxo-2-chloro-5,7-dimethyl-indene-3-carboxylic acid, which according to chromatography is approximately pure.

The halogenoindenone-carboxylic acids described in Examples b to i can be prepared analogously. In these cases, the reaction temperatures indicated in the particular examples are used. The reaction time (after the introduction of the compound of the formula b) is increased to three times the indicated period.

EXAMPLE M 54 g of powdered, anhydrous AlCl$_3$ and 10.6 g (0.1 mol) of m-xylene in 70 ml of 1,1,2,2-tetrachloroethane are initially introduced into a stirred flask with a HCl outlet. 17.8 g (0.1 mol) of dichloromaleic anhydride are then added in the course of about 30 minutes and the mixture is stirred at 20°-30° C. for 2 hours. The mixture is then kept at a temperature of 55°-60° C. for 10 hours and poured into ice-water which contains 25 ml of concentrated hydrochloric acid. The tetrachloroethane solution is separated off, about 250 ml of water are added and the solvent is distilled off in vacuo in a rotary evaporator. The product is filtered off, washed with a little water and dissolved at room temperature in 800 ml of water with the addition of the necessary amount of sodium carbonate. After separating off an insoluble impurity by filtration, excess hydrochloric acid is added to the filtrate and the product which has precipitated is isolated in the customary manner. This yields 20.5 g (87% of theory) of 1-oxo-2-chloro-5,7-dimethyl-indene-3-carboxylic acid, the characteristics of which correspond to those described in Example a.

EXAMPLES N TO P

The following compounds are prepared analogously: 1-oxo-2-chloro-5,6-dimethylindene-3-carboxylic acid, 98% of theory, melting point 229° (recrystallised from glacial acetic acid), using o-xylene. The product corresponding to Example c is obtained from p-xylene, and a 1-oxo-2-chloro-4,5,7-trimethylindene-3-carboxylic acid with a melting point of 194° (recrystallised from toluene) is obtained from 1,2,4-trimethylbenzene.

EXAMPLE Q 71 g (0.3 mol) of 1-oxo-2-chloro-5,7-dimethylindene-3-carboxylic acid are suspended in 400 ml of ethylene glycol dimethyl ether and 250 ml of ethylene glycol. 70 ml of concentrated sulfuric acid are added, with stirring, and the mixture is kept at a temperature of 55°-60° for 48 hours. The reaction mixture is introduced into ice-water and the resulting mixture is filtered. The residue on the suction filter is suspended in 2 liters of water, the pH of the suspension is adjusted to 8 with sodium carbonate and the suspension is filtered and the material on the filter is washed with 500 ml of water. After drying, 42 g of the ester of the formula

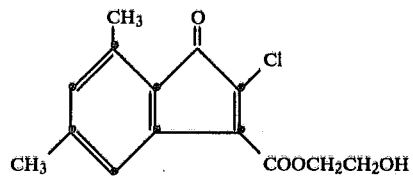

are obtained; melting point 112° (recrystallised from toluene).

Carboxylic acid which has not been esterified can be recovered from the alkaline filtrate containing sodium carbonate, by precipitating with hydrochloric acid, and can be re-used.

EXAMPLE R

The 2-chloro-indenonecarboxylic acid ester of the formula

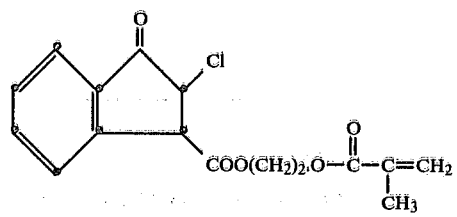

2.0 g (0.03 mol) of 2-hydroxy-ethyl chloroindenonecarboxylate are dissolved in 20 ml of dry methylene chloride. 3 g (0.03 mol) of sodium carbonate are added to this solution. A solution of 3.5 g (0.033 mol) of methacrylic acid chloride in 5 ml of dry methylene chloride is added dropwise to this mixture. After the reaction has taken place, the solution is filtered to remove the sodium chloride formed and sodium carbonate.

The filtrate is washed until neutral and is then evaporated to dryness in a rotary evaporator. Yield of the ester: 84% of theory.

Melting point: 98°–100° C.

NMR(CDCl$_3$): 2.0 ppm [3H], 2.6 ppm [4H] 5.6 and 6.2 ppm [2H], 7.1–7.8 ppm [4H].

Elementary analysis: Calculated: 59.92% C, 4.09% H, 11.05% Cl; Found: 59.86% C, 4.03% H, 11.27% Cl. C$_{16}$H$_{13}$O$_5$ Cl (320.73).

USE EXAMPLES

EXAMPLE I

The coating solution prepared according to Example 1 is used to coat copper-laminated epoxy laminates:

Copper-laminated epoxy sheets are coated with the abovementioned polymer solution using a coating centrifuge. After drying, an approximately 5 μm thick polymer film is obtained on the copper surface. The dry sheet coated in this way is exposed for 3 minutes through a line negative to UV light (wavelength above 320 nm); light source: 400 watt high-pressure mercury vapour lamp; distance 50 cm. After exposure, the resulting image is already visible and the parts which have not been exposed are dissolved out by developing in cyclohexanone. The copper which has now been uncovered is dissolved out by etching with iron-III chloride and a copper image corresponding to the line negative is obtained.

EXAMPLE II

The coating solution prepared according to Example 4 is used to coat aluminium films:

The aluminium film is coated with the above-mentioned polymer solution using a coating centrifuge and is then dried. After drying, an approximately 5 μm thick polymer film is obtained on the aluminium support. The plate coated in this way is exposed for 1 minute through a line negative to UV light (wavelength above) 320 nm, light source: 400 watt high-pressure mercury vapour lamp, distance 50 cm). After exposure, the resulting image is already visible and the parts which have not been exposed are dissolved out by developing in 5% sodium bicarbonate solution. The resulting relief image can be rendered more intense by means of cationic dyes, for example Maxilon red. The coloured image of the negative original forms.

What is claimed is:

1. A polymer, crosslinkable under the action of light, which has an average molecular weight between 1,000 and 100,000, as measured by the intrinsic viscosity of a solution of said polymer in N,N-dimethylformamide at 20° C., and which has side groups of the formula I

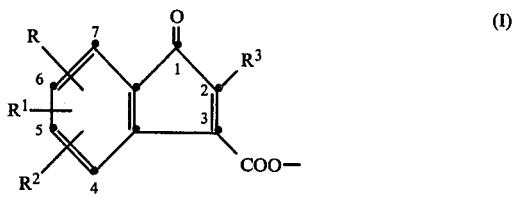

in which R$^3$ is Cl or Br, and R, R$^1$ and R$^2$ are identical or different and R is a n-alkyl radical having 1 to 4 C atoms, or is H, Cl, Br or F, R$^1$ is an n-alkyl radical having 1 to 4 C atoms, or is H, and R$^2$ is H or CH$_3$, or R$^1$ and R$^2$ together are the group —CH$_2$CH$_2$CH$_2$—, with the proviso that in the latter case the bond to the six-membered ring is via the C atoms in the 5-position and 6-position of the nucleus, the proportion of groups of the formula I being at least 5%, based on the number recurring structural elements of the polymer, said polymer being derived from an epoxy novolac, wherein said polymer contains recurring structural elements of the formula X

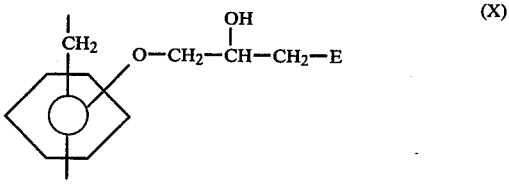

in which the radical E has the formula I.

* * * * *